April 28, 1964  J. E. GUTRIDGE ETAL  3,130,688
HIGHWAY-RAILWAY TRANSPORTATION APPARATUS
Filed Feb. 20, 1961  7 Sheets-Sheet 1

INVENTORS
JACK E. GUTRIDGE
WILLIAM R. HUMMEL
BY
ATTORNEYS

April 28, 1964   J. E. GUTRIDGE ETAL   3,130,688
HIGHWAY-RAILWAY TRANSPORTATION APPARATUS
Filed Feb. 20, 1961   7 Sheets-Sheet 2

INVENTORS
JACK E GUTRIDGE
WILLIAM R. HUMMEL
BY
ATTORNEY

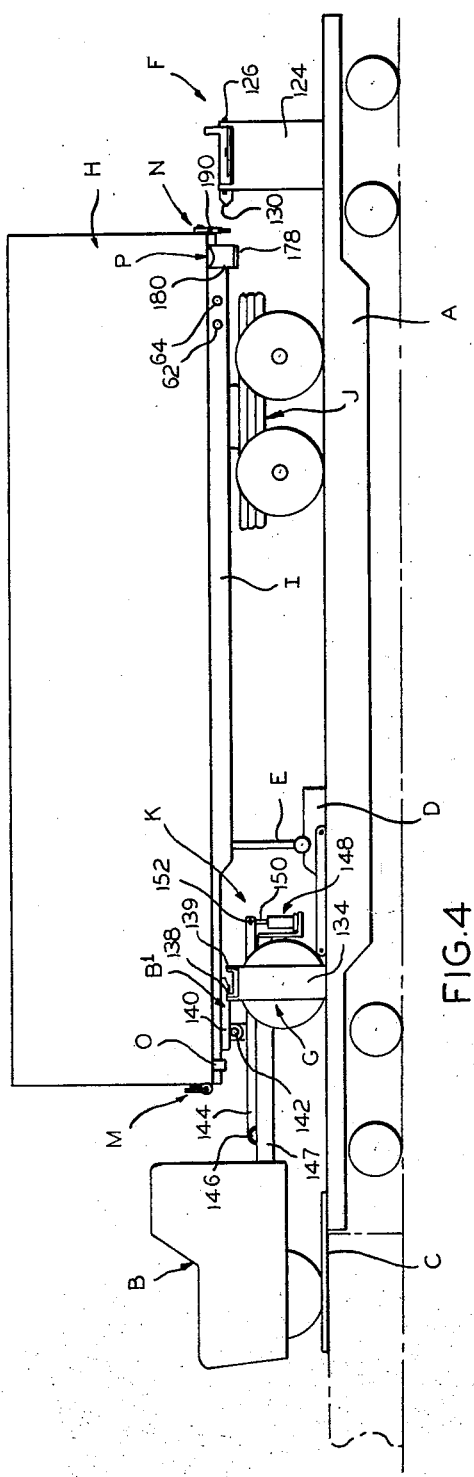
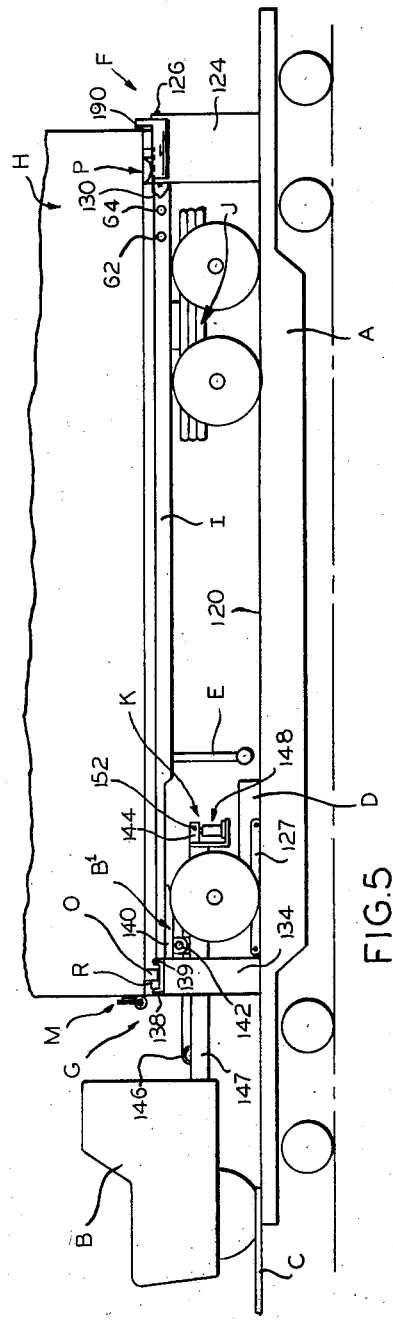
April 28, 1964  J. E. GUTRIDGE ETAL  3,130,688
HIGHWAY-RAILWAY TRANSPORTATION APPARATUS
Filed Feb. 20, 1961  7 Sheets-Sheet 3
INVENTORS
JACK E. GUTRIDGE
WILLIAM R. HUMMEL
BY
ATTORNEYS

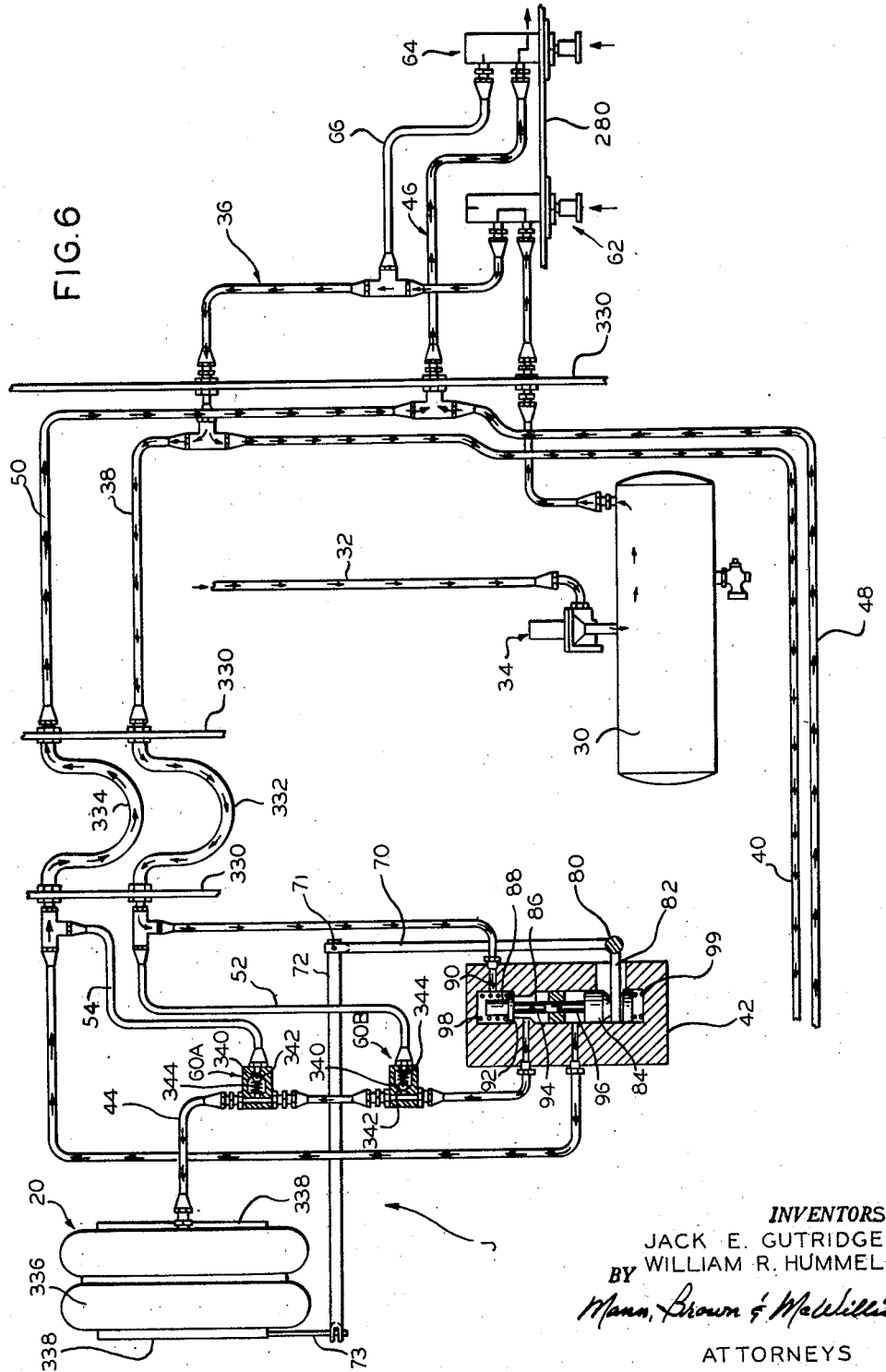

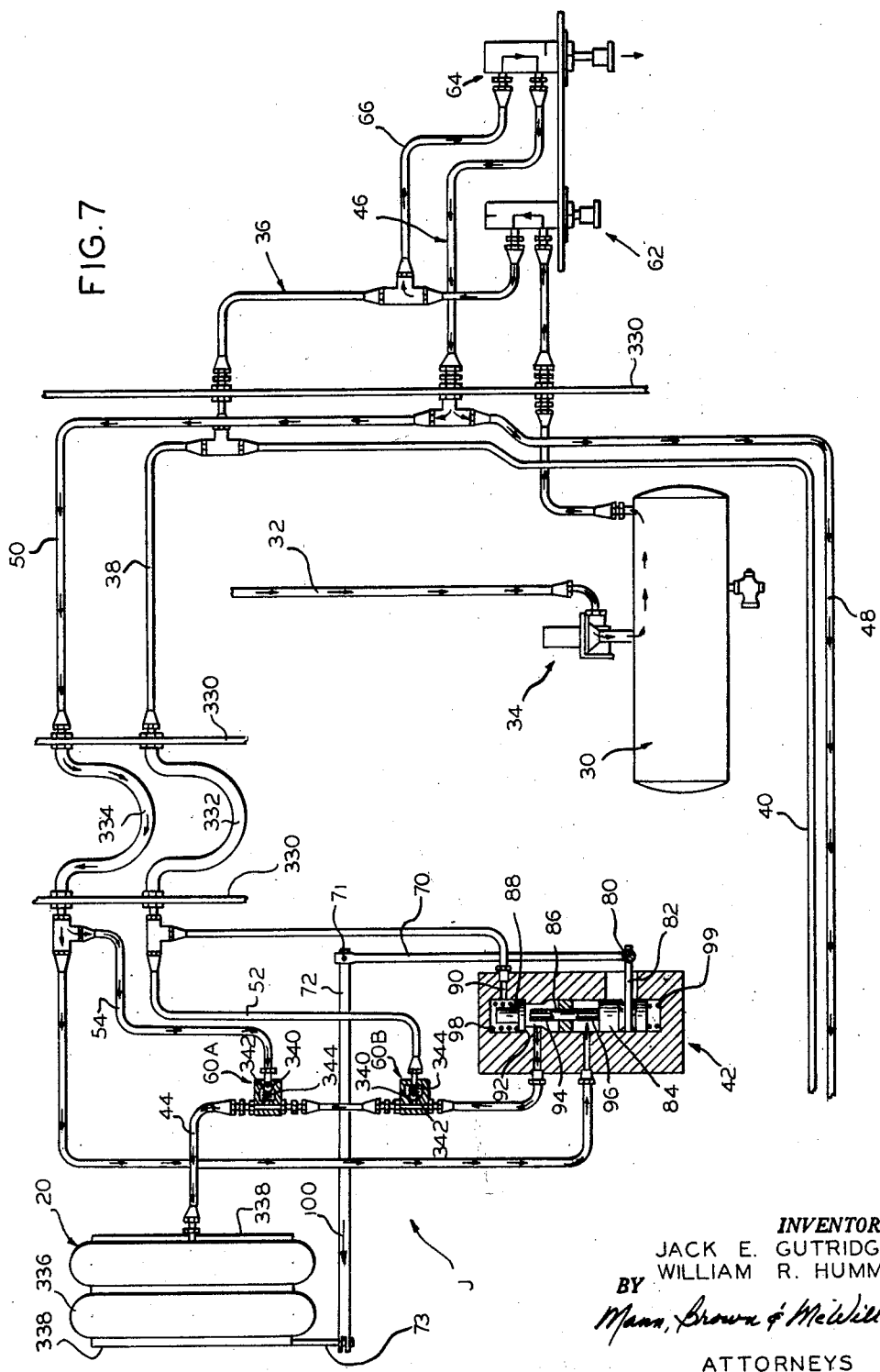

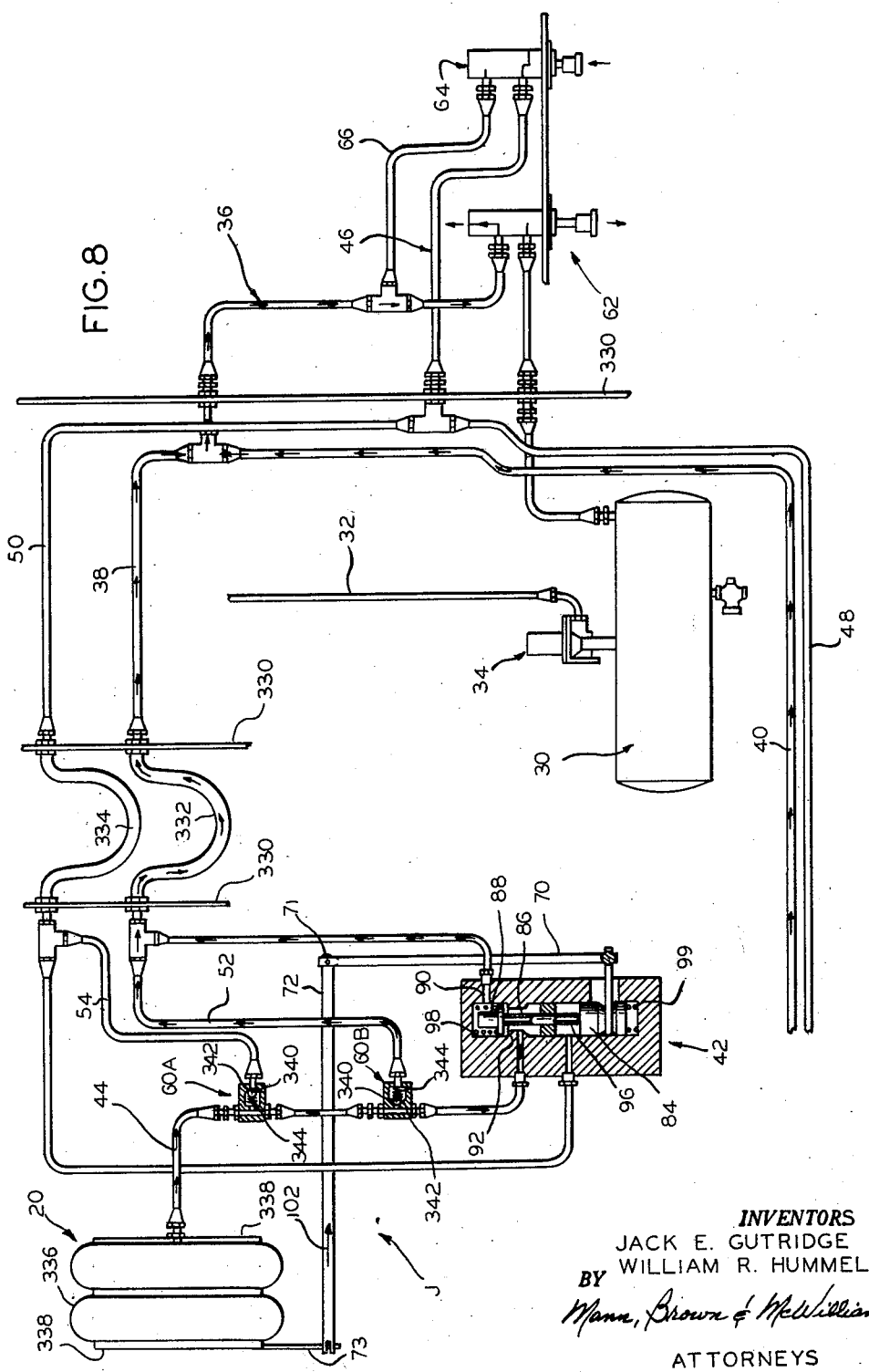

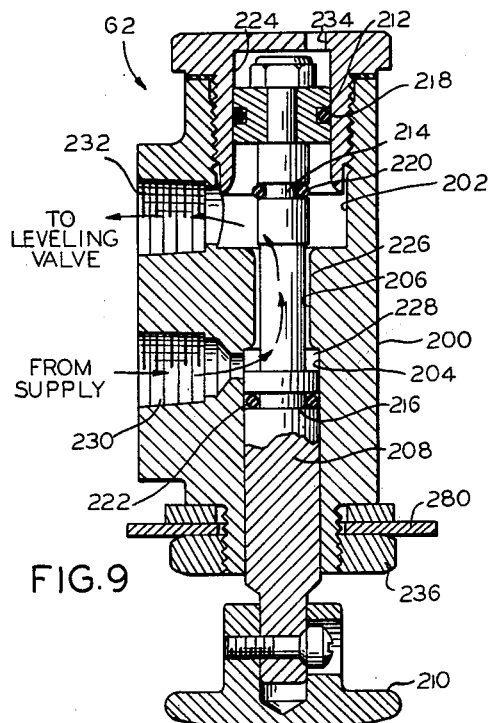
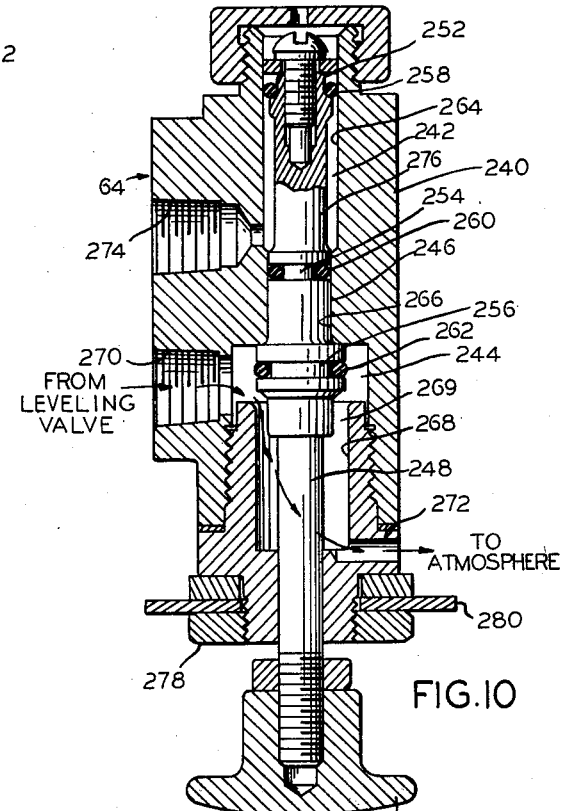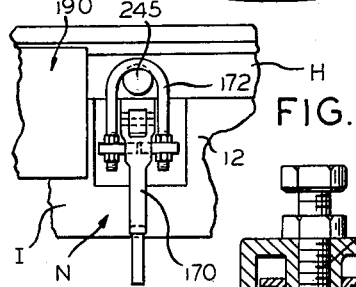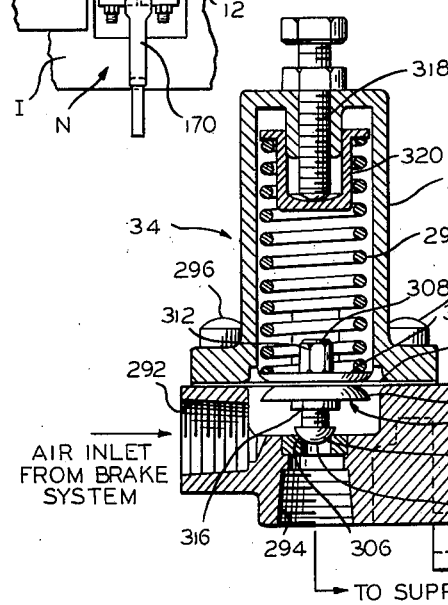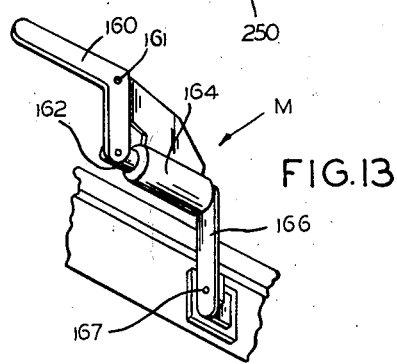

3,130,688
Patented Apr. 28, 1964

3,130,688
HIGHWAY-RAILWAY TRANSPORTATION
APPARATUS
Jack E. Gutridge, Dyer, Ind., and William R. Hummel,
Cincinnati, Ohio, assignors to Pullman Incorporated,
Chicago, Ill., a corporation of Delaware
Filed Feb. 20, 1961, Ser. No. 90,418
10 Claims. (Cl. 105—368)

Our invention relates to a highway-railway transportation apparatus, and in particular, our invention relates to the system and apparatus disclosed in copending application Serial No. 699,759, filed November 29, 1957, now Patent No. 3,070,041, granted December 25, 1962.

Application Serial No. 699,759 discloses a system and apparatus for handling freight wherein freight is loaded in a freight container that may be separably connected to a highway truck or semi-trailer chassis for highway transit and loaded onto a railroad car for rail transit separate from its chassis. The railroad car of the system is provided with container supports in the form of retractable shelf members that in their extended positions are disposed at approximately the height of the container bottom for engagement therewith.

In one use of the system of said application Serial No. 699,759, the container is loaded onto the railroad car by backing the truck or semi-trailer chassis carrying the container onto the car, extending the supports, and resting the container on the supports through the use of a chassis air spring suspension which includes controls for collapsing the air spring to allow the weight of the container to rest upon the railroad car supports, whereupon the truck or semi-trailer chassis can be pulled out from beneath the container.

This application relates to the chassis air spring suspension arrangement and discloses a novel height control apparatus therefor, as well as improvements in the overall system of said application Serial No. 699,759 (the disclosure of which is hereby incorporated herein by this reference).

One of the important distinguishing features of the system disclosed in application Serial No. 699,759 is that the container is supported on the railroad car at approximately the elevation it rides at in highway transit, with the chassis being withdrawn from under the container at the railroad loading point so that the chassis may be used for other highway transit purposes, and so a similar chassis at the railroad unloading point can be maneuvered under the container to unload it from the car for further highway transit. This requires some relative vertical movement between the chassis and its container load, and an important aspect of our invention involves effecting this movement in a practical and commercially feasible manner.

A principal object of our invention is to provide a chassis height control arrangement that automatically maintains the chassis and its container load at a predetermined standard level regardless of the actual weight of the load or axle reaction changes as bumps are encountered in highway transit, but which permits the chassis to be raised or lowered relative to such level independently of the normal functioning of the height control arrangement.

A further important object of our invention is to provide a system of handling freight in which a freight container is separably carried by a highway vehicle chassis for highway transit, or is mounted on a freight car for rail transit separate from its chassis and at an elevation above the car deck substantially corresponding to its elevation above the ground in highway transit, with any vertical movement of the container that is necessary being effected by operation of equipment carried by the highway vehicle.

Other objects of the invention are to provide an improved pneumatic system for operating highway vehicle air springs, to provide a vehicle chassis arrangement that is especially adapted for handling freight containers, to provide a system of handling freight that not only effects many economies in transporting freight, but which also is compatible with various freight transportation systems now in use, and to provide a height control arrangement for highway vehicles that is economical of manufacture, convenient in use, and readily adapted for application to existing equipment.

Other objects, uses and advantages will be obvious or become apparent from a consideration of the following detailed description and the application drawings.

In the drawings:
FIGURE 1 is an exploded perspective view of a railroad flatcar, the separable semi-trailer chassis, and the freight container, of the invention disclosed in said application Serial No. 699,759;

FIGURE 4 is a diagrammatic side elevational view illustrating a semi-trailer truck and chassis of the type contemplated by this invention on a flatcar arranged as indicated in FIGURE 1, with the truck tractor being provided with a hydraulically operated vertically shiftable fifth wheel assembly for use in conjunction with the practice of our invention;

FIGURE 5 is a view similar to FIGURE 4, but showing the container resting on the railroad car supports after the fifth wheel assembly of the truck tractor has been lowered;

Figure 2:
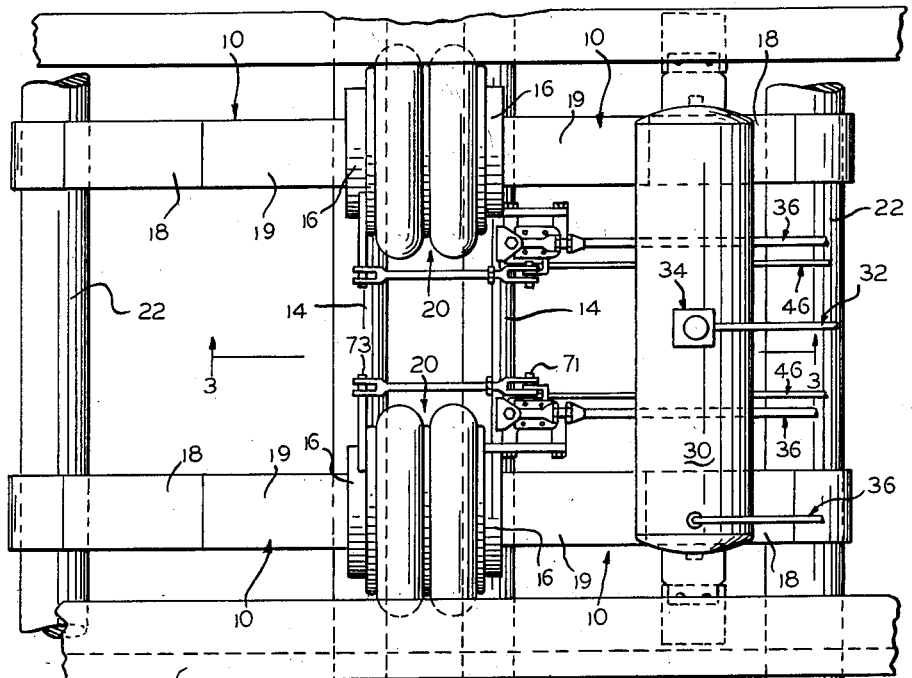
FIGURE 2 is a diagrammatic plan view of the air spring suspension system employed in the highway chassis of FIGURE 1, as it may be arranged in accordance with the principles of this invention.
Figure 3:
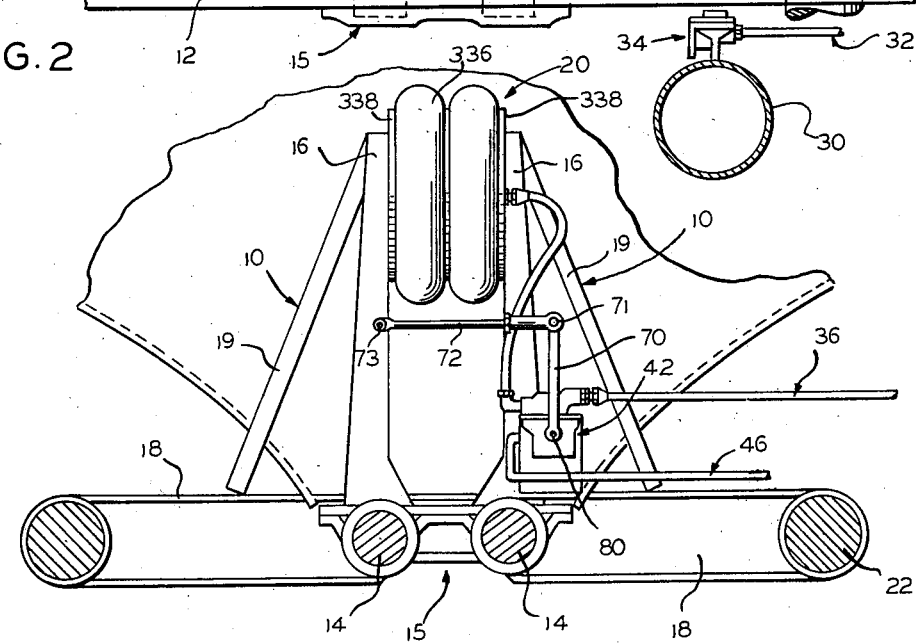
FIGURE 3 is a diagrammatic sectional view substantially along line 3—3 of FIGURE 2.

FIGURE 6 is a piping and flow diagram illustrating diagrammatically the piping and valving arrangement forming a part of the chassis height control arrangement of this invention, with normal air supply flow being indicated by the smaller arrows and normal air exhaust flow being indicated by the larger arrows, and with one of the air spring devices of FIGURES 2 and 3 being omitted to simplify the drawing;

FIGURE 7 is similar to FIGURE 6, but illustrates the air flow through the height control system when the chassis and its container load are to be raised independently of the normal functioning of the height control arrangement;

FIGURE 8 is similar to FIGURE 6, but illustrates the air flow through the piping system when the container and its chassis are to be lowered independently of the normal functioning of the height control arrangement;

FIGURES 9 and 10 are enlarged diagrammatic sectional views of two manually operated valves forming a part of the piping system shown in FIGURES 6–8, the operation of which effect the raising and lowering of the chassis and its container load independently of the normal functioning of the height control arrangement;

FIGURE 11 is an enlarged diagrammatic sectional view of a suitable limiting valve for controlling the air pressure that is supplied to the chassis air spring suspension system; and FIGURES 12 and 13 diagrammatically illustrate suitable latch devices for latching the container to the chassis.

However, it should be understood that the drawing illustrations and the specific disclosure which follows are for purposes of complying with 35 U.S.C. 112, and the appended claims should be construed as broadly as the prior art will permit consistent with the disclosure herein made.

General Description

Figure 1:
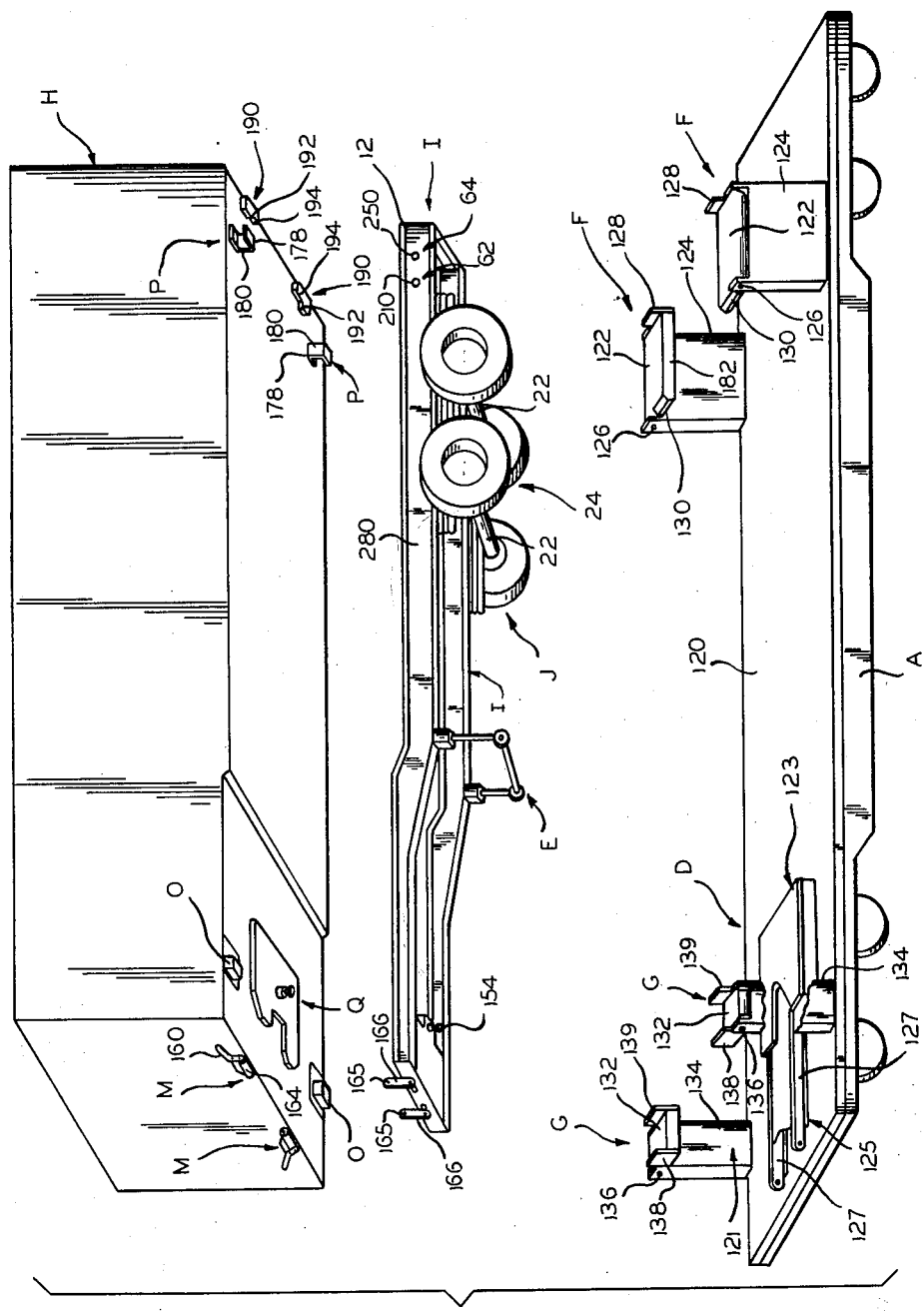

Referring first to the basic freight handling system (see FIGURES 1–5), as described in said copending application, the shipping yard facilities provided for placing the system in operation may include a single railroad track (not shown) upon which a number of flatcars or other special cars are positioned in coupled relation, one such car being generally designated A in FIGURES 1, 4 and 5.

A suitable ramp (not shown) is preferably provided at the end of the track and interconnecting the ramp with the adjacent car, and interconnecting subsequent cars, are suitable retractable sills generally designated C in FIGURES 4 and 5.

Each of the cars A is essentially a flatcar, so any truck or semi-trailer highway vehicle may be moved across its deck, but the cars may be, in some instances, modified gondola cars, flatcars equipped with a special type of side frame, or other special cars particularly suited for their intended usage. Every car which is to be used for piggyback service is provided with a fifth wheel stand generally designated D, and this is customarily used to secure conventional semi-trailer bodies to a particular car for rail transit.

Conventional practice is for the truck tractor B with its semi-trailer to back up the ramp and from car to car over the sills C to the last car in the series, whereupon the truck tractor is disconnected in the usual manner, allowing the front end of the semi-trailer to rest upon its landing wheels E, after which the truck tractor B is driven off the cars, and the front end of the semi-trailer is picked up by the fifth wheel stand D to support the front end of the trailer during travel of the railroad car.

In order to make the cars A alternatively usable with the novel system of said copending application, retractable shelves or load supports are provided at the rear of each car on opposite sides thereof, these being generally designated F. Similar retractable supports G are provided near the front end of the cars, and both front and rear supports G and F, when in their retracted positions, are disposed to permit piggyback operation in a conventional manner.

The preferred special type of semi-trailer vehicle used in practicing the invention of said copending application Serial No. 699,759 combines a freight or load container H mounted upon a special trailer chassis I. The container body is a completely rigid structure, and does not require the trailer chassis I to enable it to be supported at opposite sides of its rear and opposite sides of its front end, or at the center of the front end. The trailer chassis I is preferably supported on its wheeled axles by an air spring suspension J, which in accordance with this invention, includes the novel piping and valving arrangement illustrated in FIGURES 6–8 that permits the level of the container to be held constant in highway transit, but provides for raising and lowering of the chassis and its container load when transfer between the chassis and the railroad car is desired. It may be added that the air spring illustrations of FIGURES 1, 4 and 5 are intended to represent the showing of FIGURES 2 and 3.

The truck tractor B for the semi-trailer just described is preferably provided with hydraulic mechanism K or other equivalent apparatus for changing the elevation of the truck tractor fifth wheel structure B$^1$ with respect to the ground.

As further described in said copending application, the container and the chassis I are separably connected by employing suitable forward locks or latching devices M and rearward locks or latching devices N, and these devices may be of the type described in the application of Jack E. Gutridge, Serial No. 11,905, filed February 29, 1960 (the entire disclosure of which is hereby incorporated herein by this reference). Container H also includes blocks O that actually contact the front retractable supports G, and rear guide brackets or members P that engage the rearward supports F.

When the container of this system is to be transferred to a railroad car A from a chassis I, the chassis I is backed onto the cars A, using the motive power of the coupled truck tractor B in exactly the same manner as in the piggyback system of handling freight, with the landing gear E retracted (as customary in piggyback practice) and with the front and rear supports G and F of the cars through which the unit must pass in reaching the car to be loaded being retracted (that is, raised to a vertical position from the horizontal position indicated in FIGURE 1) to permit free transit. Preferably, the air spring suspension J and the hydraulic mechanism K are operated to raise the chassis and its container load from its normal highway transit level to a somewhat elevated position that will be above the level of the individual car supports G and F when in their extended positions of FIGURE 1; this has the effect of disposing guide members P somewhat below the level of the rear supports F in their extended positions due to the large range of vertical movement effected by the fifth wheel structure K (which tilts the container in a vertical plane so that it declines downwardly rearwardly of the container). The car which is to be loaded has its rear supports F disposed in the operative extended position of FIGURE 1, that is, in horizontal position. As the trailer is backed onto this car, the fifth wheel plate structure B$^1$ is lowered to bring the guide members P on opposite sides of the rear end of the container H upwardly into horizontal alignment with the respective supports F to center the rear of the container between supports F and place the rear end of the container on these supports, after which rearward movement of the container is stopped.

The rear container-chassis locks N are then unlatched and the air spring suspension height control is operated to exhaust the air from the air spring suspension, causing the container to rest on the rear supports F while the chassis continues to settle to its minimum height. There will now be vertical clearance between the chassis and the container at the rear of the unit.

The front supports G are then positioned as indicated in FIGURE 1 and the front chassis container locks M are opened, the hydraulic fifth wheel plate structure B$^1$ being raised if necessary to provide clearance for proper positioning of the front supports. The mechanism K controlling hydraulic fifth wheel plates structure B$^1$ is then operated to lower the front of the container onto the front supports (see FIGURE 5), after which the chassis I may be pulled out from beneath the container H, and the truck tractor and chassis may be driven off the car for use in other service.

The container H is provided with a kingpin Q which is engaged by the fifth wheel stand D when the latter is raised to its operative position. As disclosed in said copending application, the proportioning of the fifth wheel stand and the supports G and F is such that when the stand is raised to its elevated position, it lifts the front end of the container off the front supports B so that the front end of the container body is then supported on the fifth wheel stand for rail transit rather than upon the front supports G.

In practice, it may be desirable to apply a temporary stop R (see FIGURE 5) to the forward supports G, prior to withdrawal of the chassis I from under the container H, so that the container kingpin will be within the gathering range of the fifth wheel stand latch mechanism after the chassis has been withdrawn.

For unloading, a reverse sequence of steps is followed.

Referring to FIGURES 2 and 3, the air spring suspension J preferably comprises two opposed pairs of bell crank levers or rockers 10, with the opposed levers being in duplicate at opposite sides of the chassis frame 12. The rocker levers are respectively journalled on rock shafts 14 secured to the frame 12 in any suitable manner such as by bracket structures 15. Each lever 10 comprises a vertical limb or arm 16 and a horizontal limb or arm 18 interconnected by brace 19; an air spring 20 is applied between the respective pairs of opposed arms 16 while the respective arms 18 are pivotally secured to axles 22 on which the chassis road wheels 24 are journalled (see FIGURE 1).

The air spring rock lever arrangement and support therefor are similar to that disclosed in the application of James J. Black, Serial No. 707,985, filed January 9, 1958, now Patent No. 3,003,781, granted October 10, 1962, the entire disclosure of which is hereby incorporated herein by this reference. Reference may be had to that application for the specifics of the air spring, but it may be pointed out that the weight supported by the frame 12 is transmitted directly to the rock shafts 14 and through arms 18 to axles 22, with the respective air springs being under compression between the respective pairs of rockers arms 16.

The weight load of the rock shafts 14 is thus imposed upon both bell crank levers 10, tending to rock the levers about the shafts 14 and move shafts 22 toward one another to compress the respective air springs 20 and to distribute the weight load equally upon both axles 22. The bell crank levers 10 at opposite sides of the frame 12 are free to rock independently of one another and therefore each wheel is individual suspended to improve the spring action. Suitable means may be provided to prevent rotation or pivotal movement of axles 22, as described in said Black application.

The air springs 20 are supplied with air under pressure from the air system of the truck tractor by means of the piping and valving arrangement shown in FIGURES 6–8. Preferably, the pressure to the air spring is automatically controlled so that the container H and frame 12 will ride at a standard elevation above the ground in highway transit and this is done by providing a valving arrangement for adding air to air springs, or releasing air therefrom as required by the load carried by frame 12 and the changes in reaction on the axles 22 when bumps are occasioned.

Referring to FIGURE 6, the air supplied to the air spring suspension system may be provided for by connecting the air spring reservoir 30, to, for instance, the braking system of chassis I by means of a suitable conduit 32. The chassis braking system per se may be of any well known type and therefore details of same have been omitted, though it is pointed out that the air connection to the braking system may be accomplished in the manner suggested by said Black application.

Preferably, conduit 32 supplies air to reservoir 30 through a limiting valve 34 of the general type illustrated in FIGURE 11, which is arranged to avoid taking air from the vehicle brake system unless the pressure in the brake system is at a predetermined minimum, such as 65 pounds per square inch or greater. The air spring reservoir 30 has connected thereto a supply conduit 36 which is provided with branches 38 and 40 leading to the respective air springs, and which are respectively connected to a leveling valve 42. Each air spring 20 has a leveling valve 42 associated therewith and a feed conduit 44 extends between the respective leveling valves 42 and the respective air springs 20. Exhaust conduit 46, includes branches 48 and 50 that extend from the respective leveling valves 42.

In the instance of each air spring 20, a bypass conduit 52 extends between the supply conduit 36 and the feed conduit 44 while a bypass conduit 54 extends between the exhaust conduit 46 and the feed conduit 44. Conduits 52 and 54 have interposed therein oppositely acting check valves 60A and 60B.

The supply conduit 36 is accordance with this invention has interposed therein upstream of branches 38 and 40 an off-on valve 62 of the type shown in FIGURE 9, while the exhaust conduit 46 is connected to a flow orienting valve 64 of the type shown in FIGURE 10. A connector conduit 66 extends between valve 64 and the supply conduit 36 as indicated in FIGURE 6.

In the normal over-the-road operation, the valves 62 and 64 are in the retracted position shown in FIGURE 6, with the valve 62 permitting air supply through the conduit 36 and the conduit 46 exhausting to atmosphere through the valve 64, as the air suspension system operates under the control of leveling valves 42.

The respective leveling valves 42 are associated with the respective air springs and their rocker levers 10 in such a manner that an increase in the reactions on the axles due to increasing the load on the trailer chassis or hitting a bump in the road will move actuating leveling valve arms 70 to permit compressed air flow through supply conduit 36 into feed conduit 44 and thence into air spring 20 to expand the air spring the amount required to keep the trailer frame 12 and its load at the desired level or elevation. This may be done by securing the leveling valve 42 of each air spring to one of the rocker levers 10 and pivotally connecting arm 70 to the other rocker lever 10 by an appropriate link 72, as by employing pins 71 and 73, all somewhat as suggested in FIGURES 2 and 3. Similarly, a decrease in the reactions on the axles will move the arm 70 in the opposite direction to close off the connection between the supply conduit and the feed conduit 44 and open communication between the feed conduit 44 and exhaust conduit 46.

The leveling valves 42 for this purpose may comprise a rock shaft 80 to which the respective arms 70 are affixed, and which also have affixed thereto arms 82 (see FIGURES 6–8) that engage a plunger 84 that has fixed thereto a tube 86 which engages a spring biased valve member 88 that is interposed in the inlet passage 90 of the diagrammatically illustrated valve 42. When arm 70 swings in a clockwise direction, tube 86 lifts valve member 88 off its seat 92 to provide communication between supply conduit 36 and feed conduit 44. When the arm 70 is swung in a counterclockwise direction, the upper end 94 of tube 86 moves away from valve member 88 to permit air to flow from the air spring through conduit 44, into valve 42, through the end 94 of tube 86, out of ports 96 of said tube 86 and then into the exhaust conduit 46.

When the arm 70 is in the upright neutral position of FIGURE 6, the valve member 88 is biased against its seat 92 by spring 98 to seal off the air supply in the air spring while the end 94 of tube 86 is biased against the valve member 88 by spring 99 to seal off the exhaust conduit 46.

Valve 60A and 60B are both closed at all times during normal operation. When air is admitted to the respective air springs, the right hand side of valve 60A (in the showing of FIGURE 6) is open to the atmosphere through the exhaust conduit 46 and the pressure on the left hand side of this valve as well as its spring keeps valve 60A closed. This is also true when air is exhausted from the respective springs.

With regard to valve 60B, when air is being admitted to the respective springs, the right hand side of the valve 60B is connected to the supply or high pressure conduit, and this and its spring keep the valve 60B closed. When air is being exhausted from the respective springs, this is also true. Both valves 60A and 60B are preferably provided with built-in filters of a suitable type to prevent foreign matter from being carried into the respective air springs.

When it is desired to actuate the air spring suspension system to raise the trailer frame and its container load, the valve 64 is positioned to obtain the connection indicated in FIGURE 7, whereby the exhaust conduit 46 is cut off from the atmosphere and the connector conduit 66 communicates between the supply conduit 36 and the exhaust conduit 46, which gives the air flow indicated by the arrows of FIGURE 7. Since the load on the chassis axles is not changing the arms 70 of the leveling valves remain in the neutral position suggested by FIGURE 6 and thus air is not permitted to pass through the supply conduit 36. However, air passes through valve 64 into the exhaust conduit 46 and thence to the right hand side of the respective valves 60A, causing these valves to open and emit a small amount of air to the respective air springs. This expands the respective air springs and causes the respective links 72 to move in the direction of arrow 100 of FIGURE 7, and thus actuates the respective arms 70 to lower the tubes 86 to permit air to be forced through the leveling valves and into the respective feed conduits 44 and the air springs to which they are connected.

During this operation, the right hand side of the valve 60B is subject to the high pressure in the supply conduit 36 with the result that valve 60B remains closed. The normal air inlet 90 of the leveling valve is also open to the high pressure in the supply conduit 36, but the movement of the actuating arm 70 is in a direction to keep valve member 88 seated on its seat 92.

Ordinarily, when the air spring suspension system is operated in the manner suggested by FIGURE 7, valve 64 remains in its indicated position until it is desired to lower the container. This is done by moving valve 64 to its position of FIGURE 6 and moving valve 62 to the position of FIGURE 8. This opens the exhaust conduit 46 to the atmosphere and also opens the supply conduit 36 to the atmosphere through valve 62. Thus, all supply air to the air springs 20 is shut off at the valve 62. The pressure in the respective air springs 20 will open the respective valves 60B to the atmosphere through valve 62 and air will leave the air spring bellows through the normal supply conduit 36, as indicated by the arrows of FIGURE 8. As the respective air springs begin to deflate, the links 72 move in the direction of the arrow 102 of FIGURE 8 to position the respective arms 70 so that valve member 88 is lifted off its seat 92 to permit air to escape through supply conduit 36. This permits all the air to be exhausted from the air springs, thereby lowering the chassis frame 12 to its position of minimum elevation.

The valve setting of FIGURE 8 is maintained until it is desired to restore the normal level of operation of the chassis frame, at which time the valve 62 is moved to the position of FIGURE 6, and since valves 42 are positioned to open the air springs 20 to supply conduit 36, and since valve 62 opens conduit 36 to the source of air supply, the frame 12 is immediately restored to its predetermined operating level or elevation.

It will thus be seen that not only is the operation of the freight handling system of said copending application simplified and improved but also there is provided an efficient and fool-proof height control arrangement for the chassis air spring suspension system.

*Specific Description*

The railroad car, the highway vehicle chassis and container body, and the truck tractor are essentially the same as described in said copending application, although the drawings indicate certain modifications.

The railroad car A may be of any suitable type, though preferably it is provided with a relatively flat bed 120 and the retractable supports G and F are spaced laterally of the car to define an open runway 121 along the length of the car for tractors and trailers to be moved as required. The stand D may be of any suitable type, though the general form shown in the copending application of Jack E. Gutridge, Jack W. Borger and Kenneth J. Austgen, Serial No. 710,710, filed January 23, 1958 (the entire disclosure of which is hereby incorporated herein by this reference), will be found to serve the purpose. This type of fifth wheel stand may be raised and lowered by using a power wrench, and this facilitates the practice of our invention in the loading and unloading of the cars. Reference may be had to said application Serial No. 710,710 for a complete disclosure of a suitable stand D, but it is pointed out that stand D includes fifth wheel plate structure 123 provided with a suitable latch device (not shown) for engaging the container kingpin Q, and mounted on a lift structure 125 that includes swingably mounted diagonal struts 127 and vertical struts (not shown) which are moved from a horizontal position to a vertical position to support fifth wheel plate structure 123, all as specifically described in said application Serial No. 710,710.

The rear support members F comprise shelf members 122 pivotally secured to stanchions 124 by suitable pins 126 and provided with suitable stop portions 128 at their rearward ends and ramp portions 130 at their forward ends. The stop portions 128 limit rearward motion of the container with respect to the car while the ramp portions 130 facilitate engagement of the brackets P with the shelf members 122.

The forward supports G comprise shelf members 132 pivotally secured to stanchions 134 by appropriate pins 136. Shelf members 132 are provided with forward and rearward stops 138 and 139, between which the container support blocks O are disposed when the container H is rested on the shelf members 132.

Shelf members 122 and 132 may be locked in their extended and retracted positions in any suitable manner such as that disclosed in said copending application. Furthermore, the railroad car A may have two or more sets of the supports F and G applied thereto, rather than the single set indicated in FIGURES 1, 4 and 5, depending on the length of container H to be handled, the length of car A, and the like factors.

The truck tractor B illustrated is intended to represent any conventional form of truck tractor having an elevatable fifth wheel plate structure $B^1$. In the form illustrated, the tractor fifth wheel plate 140 of structure $B^1$ is pivotally secured as by pin 142 to a frame 144 that is in turn pivotally secured as at 146 to the tractor bed 147; at the other end of the frame 144, a hydraulic cylinder and piston device 148, forming mechanism K, is interposed between the frame 144 and the truck bed to provide for elevation of the tractor fifth wheel plate 140, somewhat as suggested by FIGURES 4 and 5. The piston rod 150 is pivotally secured to the frame 144 as at 152.

The tractor fifth wheel plate 140 may have associated therewith any type of locking mechanism for grasping the kingpin 154 (see FIGURE 1) of chassis I, and, of course, structure $B^1$ and mechanism K may likewise be of any suitable type. During normal operation of our system of handling freight, the tractor remains connected to the chassis I, though if desired the chassis I and the container H may be transported piggyback fashion on car A by using the customary piggyback loading procedures and leaving supports F and G in their retracted positions.

The forward latching devices M (see FIGURE 13) of the container H and chassis I may comprise bell crank levers 160 pivotally secured as at 161 to the container and actuating lock pins 162 that are slidably mounted, in tubular bodies 164 fixed to the container, which pins are adapted to engage appropriate perforations 165 (see FIGURE 1) formed in the respective arms 166 pivotally secured to the forward end of the chassis as at 167.

The rear latching devices N (see FIGURE 12) may be in the form of the common trunk lock type latching device including a lever 170 pivotally secured to the rear of chassis I pivotally mounting a U-shaped locking retainer 172 which is adapted to engage a stud 245 affixed to the rear end of the container H. The latching devices N are not shown in FIGURE 1, but are ordinarily two in number applied to the container and chassis in spaced apart relation between bumpers 190.

The guide devices P may be in the form of the simple channel-shaped brackets 178 illustrated in FIGURE 1, having their respective webs 180 spaced apart as required to properly center the container body H with respect to the rear shelf members 122 by engagement with the side edges 182 thereof.

The container H also preferably has secured to the bottom thereof at the rear of the container spaced bumpers 190 which include inclined or diagonally disposed deflecting surfaces 192 that are adapted for engagement with the rear end of an empty chassis. The bumpers are spaced apart a distance less than the width of the chassis so that the rear end of the chassis will be guided into proper abutting relation with stop surfaces 194. Bumpers 190 insure that the rear end of the chassis will be properly positioned with respect to the rear end of the container when the chassis is backed underneath the container for purposes of unloading the container from the car. Of course, bumpers 190 and rear latch devices N are positionally coordinated so that when the chassis has been backed "home" under the container, the latch devices N may be operated to lock the container to the chassis.

It may be pointed out that when a container H is to be removed from the car A, after stand D is lowered to its retracted position, an empty chassis I with its air spring suspension J in the condition of FIGURE 8 is backed under a container body 32 until the rear of the chassis contacts bumpers 190, after which the air spring suspension J is placed in the condition of FIGURE 7 and the tractor fifth wheel mechanism K is operated to raise the chassis into full engagement with the container and lift it to its maximum height. After latch devices M and N are closed, the container is withdrawn from the car, the air spring suspension being placed in the condition of FIGURE 6 at any convenient time.

It will be apparent that containers H may be applied to and removed from retractable supports comparable to F and G mounted at railroad yards as well as shipper's yards for storage of containers ready for pick-up as the occasion requires. Suitable yard facilities are disclosed in said copending application Serial No. 699,759.

The valves 62, 64 and 34 shown in FIGURES 9–11 are generally illustrative of the types of valve that will serve the functions indicated in FIGURES 6–8. While it will be appreciated that other specific forms of valves may be substituted for those shown, the following specific description and corresponding drawing illustrations are provided for completeness of disclosure.

The valve 62 (see FIGURE 9) generally comprises a body 200 formed with chambers 202 and 204 connected by passage 206. A plunger 208 extends through the passage 206 as well as chambers 204 and 202 and is provided with a handle 210 for actuation by the operator. Plunger 208 is recessed at 212, 214 and 216 to receive conventional O-ring seals 218, 220 and 222, respectively, which are adapted to respectively sealingly engage the valve walls 224, 226 and 228, respectively, when the valve plunger 208 is appropriately positioned.

As indicated in FIGURE 9, the plunger 208 is proportioned in diameter along the portion thereof that extends through passage 206 to provide communication between inlet port 230 and outlet port 232, as indicated by the arrows. When the plunger 208 is drawn outwardly to the position indicated by FIGURE 8, the O-ring seal 220 is disposed in sealing engagement with the wall 226 defining passage 206. The body 200 is vented to the atmosphere as at 234 for ease in operating the plunger in view of the sealing action of O-ring 218.

Valve body 200 may be secured to the frame in any suitable manner, as by employing nut 236 for this purpose.

The valve 64 (see FIGURE 10) comprises body 240 formed with chambers 242 and 244 connected by passage 246. Extending through the chambers 242, the passage 246 and the chamber 244 is a plunger member 248 provided with actuating handle 250. The plunger 248 is recessed as at 252, 254 and 256 for carrying conventional O-ring seals 258 and 260 that are respectively adapted to sealingly engage the respective walls 264 and 266 that define the chamber 242 and passage 246, respectively, as well as seal 262 that is adapted to sealingly engage wall 268 of exhaust chamber 269. In the position of FIGURE 10, the seal 260 of plunger member 248 seals off communication between valve body ports 270 and 274, but when the valve plunger member 248 is moved to the position of FIGURE 7, the seal 260 is moved outwardly of passage 246 and into chamber 244 while seal 262 is moved into sealing engagement with wall 268 of chamber 269, thus bringing ports 270 and 274 into communication through passage 246 in view of the reduced portion 276 of the plunger member.

Valve body 240 may be secured to the vehicle by an appropriate nut 278.

In the showing of FIGURES 9 and 10, the valve bodies 200 and 240 are shown applied to one of the longitudinal members 280 that define the chassis frame I. These valves may be located with respect to the chassis wheels in the manner suggested by FIGURE 1, or any other convenient place on the chassis frame.

The limiting valve 34 (see FIGURE 12) comprises a valve body 290 formed with inlet and outlet ports 292 and 294, and which has secured thereto as by screws 296 a cap 298 that houses spring 299 which acts against a valve member generally designated 302 which includes a diaphragm 300 and a valve head 304 that is adapted to engage seat 306. In the illustrated form, the valve member 302 comprises a screw 308, having an unslotted head 309 that forms valve head 304, that extends through diaphragm 300 and bearing discs 310, and is secured in place by nuts 312 and 316. Screw 318 bearing against spring seat 320 permits the compression of spring 299 to be adjusted so that valve member 302 will open only when the pressure from the highway vehicle brake system is at least at a predetermined minimum. Valve body 290 may be affixed to reservoir 30 in any suitable manner.

The conduiting indicated in FIGURES 6–8 may be secured to the chassis I in any convenient manner. These figures show chassis framing components 330 and flexible conduits 332 and 334 forming part of the supply and exhaust conduits 36 and 46, respectively, but obviously these expedients may be employed as desired and take any suitable form, as may the specific conduiting employed.

Air spring 20 is shown only diagrammatically as it may be of any appropriate air cell structure including a flexible air impervious bellows 336 and end closure members 338.

Check valves 60A and 60B may be of any appropriate type having the functions indicated. Those indicated are of the ball check type each including a ball 340 urged against a seat 342 by a spring 344, but the illustrated valve structure is merely suggestive of the general type of valve structure contemplated. However, these valves should be oppositely acting, as already indicated.

*Distinguishing Characteristics of the Invention*

As is made clear in said copending application, it will be seen that the system therein disclosed, including the improvements herein disclosed, inherently possess features of compatibility, versatility, simplicity, low cost, protection of equipment and lading, adequate clearances and stability, economies of operation, and many other advantages which make it attractive for adoption for coordinated highway and railway freight traffic.

It will also be noted that all power requirements for operation of this system may be derived from the truck tractor; thus, for example, the hydraulic system for raising and lowering the tractor fifth wheel assembly K. and also the compressor equipment (not shown) for use in connection with the air springs represent conventional apparatus usually carried by conventional truck-trailers. Even the power wrench for operating the fifth wheel stand may be operated from power supplied by a truck tractor, where the specific stand structure used makes this appropriate.

The air spring suspension J constitutes a simplified but efficient manner of raising and lowering the highway vehicle chassis for separation of the container body from the chassis, but in addition, the air springs have the important characteristic of maintaining the container body at a constant distance above the ground regardless of loading of the container. Obviously, this facilitates cooperation with the rear supports when the freight container is backed into the car.

The specific height control arrangement herein disclosed not only achieves automatic positioning of the chassis frame and its container held at the desired level above the ground, but also permits ready raising and lowering of the chassis and container independently of the operation of normal height control merely by manipulation of two simple valve devices.

It will be appreciated that this system as a whole is extremely advantageous from the standpoint of being able to handle large container loads. Thus, fully loaded semi-trailer size container bodies may be readily transferred between a highway chassis and the railroad car by using only the motive power of the truck tractor. Under ordinary circumstances, only two men are required to load and load an entire train of cars A, namely the truck driver, who moves the truck as required and also manipulates front railroad car supports G and the container latching devices M, with the second man handling the power wrench for raising and lowering the fifth wheel stand (or otherwise seeing to the raising and lowering of the stand) and also positioning the rear supports F as required as well as operating the rear container latch devices N and the manually operable valves 62 and 64.

It is pointed out that the highway vehicle disclosed may alternately take the form of a pick-up type truck, in which case a suitable lifting device may be provided between the front end of the container H and the pick-up truck chassis, such as a hydraulic jack device or a collapsible air bellows of the air spring type.

In the appended claims, the terms "separated," "separable," or words of like import, as used in conjunction with the freight container and the chassis, are not intended to require a physical separation, but rather are used in a broad sense to include relief of loading between the container and the chassis.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. In apparatus for transporting freight including a freight container, a wheeled chassis including a frame to which the container is adapted to be connected, and a railroad car including an open deck extending lengthwise of the car and adapting same to serve as a roadway for movement of the chassis lengthwise of the car and retractable supports secured to either side of the car on which the container is to be rested when the supports are moved to extended positions at an elevation above the deck that is substantially equivalent to the distance that the container is above the ground when transported by the chassis, the improvement wherein an air spring suspension system is interposed between the chassis wheels and frame, said system comprising an air spring, means for mounting said air spring between said frame and said wheels to carry the weight of said frame and its container load, a supply conduit adapted to be secured to a source of air under pressure, a leveling valve, said supply conduit being connected to said leveling valve, a feed conduit extending between said leveling valve and said spring, off-on valve means interposed in said supply conduit between said source of air under pressure and said leveling valve including means for opening said supply conduit or alternately closing same and connecting the portion of said supply conduit extending between said off-on valve means and said leveling valve with an air discharge outlet, a flow orienting valve, an exhaust conduit extending between said leveling valve and said flow orienting valve, a connector conduit extending between said flow orienting valve and said supply conduit, said connector conduit being connected to said supply conduit between said off-on valve and said leveling valve, said flow orienting valve including means for alternatively connecting said exhaust conduit to an air discharge outlet or to said supply conduit, said leveling valve including means for alternatively connecting said supply and exhaust conduits to said feed conduit in response to weight changes on said spring, a first bypass conduit extending between said supply conduit and said feed conduit in bypassing relation to said leveling valve, and a second bypass conduit extending between said exhaust conduit and said feed conduit in bypassing relation to said leveling valve, said first bypass conduit having check valve means interposed therein for permitting fluid flow only from said feed conduit to said supply conduit, said second bypass conduit having check valve means interposed therein for permitting fluid flow only from said exhaust conduit to said feed conduit, whereby said off-on valve and said flow orienting valve may be operated to permit said leveling valve to maintain said chassis frame and its load at a predetermined elevation, or to permit the chassis frame and its load to be raised or lowered independently of the normal functioning of said leveling valve means.

2. The improvement set forth in claim 1 including limiting valve means interposed in said supply conduit for precluding the supply of air to said supply conduit when the air pressure of said source falls below a predetermined minimum.

3. Trailer apparatus comprising a trailer vehicle including a chassis adapted for connection to a truck-tractor, said chassis comprising a frame, wheels for the frame, an air spring, means for mounting said air spring to carry the weight of said frame and its load, a supply conduit adapted to be connected to a source of air under pressure, a leveling valve, said supply conduit being connected to said leveling valve, a feed conduit extending between said leveling valve and said air spring, off-on valve means interposed in said supply conduit between said source of air under pressure and said leveling valve and including means for opening said supply conduit or alternately closing same and connecting the portion of said supply conduit extending between said off-on valve means and said leveling valve with an air discharge outlet, a flow orienting valve, an exhaust conduit extending between said leveling valve and said flow orienting valve, a first bypass conduit extending between said supply conduit and said feed conduit in bypassing relation to said leveling valve, a second bypass conduit extending between said exhaust conduit and said feed conduit in bypassing relation to said leveling valve, oppositely acting check valve means interposed in the respective bypass conduits, said check valve means respectively acting to prevent fluid flow from said feed conduit to said exhaust conduit and from said supply conduit to said feed conduit, said leveling valve including means for alternatively connecting said supply and exhaust conduits to said feed conduit in response to weight changes on said spring to maintain said frame at a predetermined level, a connector conduit extending between said flow orienting valve and said supply conduit, said connector conduit being connected to said supply conduit between said off-on valve means and said leveling valve, said flow orienting valve including means for alternatively connecting said exhaust conduit to an air discharge port or to said supply conduit.

4. The apparatus set forth in claim 3 wherein said means of said leveling valve comprises linkage means for operating said leveling valve to connect said supply conduit to said feed conduit when the weight on said frame is increased and for operating said leveling valve to connect said feed conduit with said exhaust conduit when the weight on said frame is lessened, said off-on valve means and said flow orienting valve when operated serving to actuate said check valve means to overcome the sensing function of said linkage means.

5. The apparatus set forth in claim 3 including an air reservoir carried by said chassis, said supply conduit being connected to said air reservoir, and forming an outlet therefrom, a further supply conduit connected to said reservoir and adapted for connection to said source, and limiting valve means interposed in said further supply conduit for precluding the supply of air to said reservoir when the air pressure of said source falls below a predetermined minimum.

6. Apparatus for handling freight comprising a chassis including a frame adapted to be separably connected to a container body, a pair of tandem axles journalling road wheels, a pair of bell crank levers positioned between said axles and mounted for pivotal movement about axes extending parallel thereto, said levers having like arms respectively secured to said axles, an air spring mounted between the other arms of said levers, a supply conduit adapted to be connected to a source of air under pressure, a leveling valve, said supply conduit being connected to said leveling valve, a feed conduit extending between said leveling valve and said air spring, off-on valve means interposed in said supply conduit between said source of air under pressure and said leveling valve and including means for opening said supply conduit or alternately closing same and connecting the portion of said supply conduit extending between said off-on valve means and said leveling means with an air discharge outlet, a flow orienting valve, an exhaust conduit extending between said leveling valve and said flow orienting valve, a first bypass conduit extending between said supply conduit and said feed conduit in bypassing relation to said leveling valve, a second bypass conduit extending between said exhaust conduit and said feed conduit in bypassing relation to said leveling valve, oppositely acting check valve means interposed in the respective bypass conduits, said check valve means respectively acting to prevent fluid flow from said feed conduit to said exhaust conduit and from said supply conduit to said feed conduit, said leveling valve including means for alternatively connecting said supply and exhaust conduits to said feed conduit in response to weight changes on said spring to maintain said frame at a predetermined level, a connector conduit extending between said flow orienting valve and said supply conduit, said connector conduit being connected to said supply conduit between said off-on valve means and said leveling valve, said flow orienting valve including means for alternatively connecting said exhaust conduit to an air discharge outlet or to said supply conduit.

7. The apparatus set forth in claim 6 wherein said means of said leveling valve comprises a rocker arm operably connected to said leveling valve, and a link extending between said rocker arm and one of said levers, said leveling valve being mounted on the other of said levers.

8. The apparatus set forth in claim 6 wherein said off-on valve and said flow orienting valve are secured to said frame, and include handle means projecting outwardly of said frame for manual operation thereof.

9. In apparatus for transporting freight including a freight container, a wheeled chassis including a frame to which the container is adapted to be connected, and a railroad car including an open deck extending lengthwise of the car and adapting same to serve as a roadway for movement of the chassis lengthwise of the car and retractable supports secured to either side of the car on which the container is to be rested when the supports are removed to extended positions at an elevation above the deck that is substantially equivalent to the distance that the container is above the ground when transported by the chassis, the improvement wherein an air spring suspension system is interposed between the chassis wheels and frame, said system comprising an air spring, a pair of tandem axles journalling road wheels to form the wheels of said chassis, a pair of bell crank levers positioned between said axles, and mounted for pivotal movement about axes extending parallel thereto, said levers having like arms respectively secured to said axles, a pair of rock shafts secured between said axles and in parallel relation thereto, said levers being respectively pivoted on said rock shafts, said levers having like arms respectively secured to said axles, with said air spring mounted between the other arms of said levers, strut means securing said frame to said rock shafts, a supply conduit adapted to be connected to a source of air under pressure, a leveling valve, said supply conduit being connected to said leveling valve, a feed conduit extending between said leveling valve and said air spring, off-on valve means interposed in said supply conduit between said source of air under pressure and said leveling valve and including means for opening said supply conduit or alternately closing same and connecting the portion of said supply conduit extending between said off-on valve means and said leveling valve with an air discharge outlet, a flow orienting valve, an exhaust conduit extending between said leveling valve and said flow orienting valve, a first bypass conduit extending between said supply conduit and said feed conduit in bypassing relation to said leveling valve, a second bypass conduit extending between said exhaust conduit and said feed conduit in bypassing relation to said leveling valve, oppositely acting check valve means interposed in the respective bypass conduits, said check valve means respectively acting to prevent fluid flow from said feed conduit to said exhaust conduit and from said supply conduit to said feed conduit, said leveling valve being mounted on one of said levers and including means for alternatively connecting said supply and exhaust conduits to said feed conduit in response to weight changes on said spring to maintain said frame at a predetermined level, said means of said leveling valve comprising a rocker arm operably connected to said leveling valve, and a link extending between said rocker arm and the other of said levers, a connector conduit extending between said flow orienting valve and said supply conduit and connected to said supply conduit between said flow orienting valve and said leveling valve, said flow orienting valve including means for alternatively connecting said exhaust conduit to the atmosphere or to said supply conduit, said off-on valve means and said flow orienting valve being secured to said frame in side-by-side relation at one side of the frame, said off-on valve means and said flow orienting valve each including handle means projecting outwardly of said chassis frame for manual operation thereof.

10. In a vehicle fluid suspension system for controlling the clearance height between the sprung mass and the unsprung mass of a vehicle, an air spring operatively interposed between the sprung and unsprung vehicle masses, a supply conduit adapted to be connected to a source of air under pressure, a leveling valve, said supply conduit being connected to said leveling valve, a feed conduit extending between said leveling valve and said air spring, off-on valve means interposed in said supply conduit between said source of air under pressure and said leveling valve and including means for opening said supply conduit or alternately closing same and connecting the portion of said supply conduit extending between said off-on valve means and said leveling valve with an air discharge outlet, a flow orienting valve, an exhaust conduit extending between said leveling valve and said flow orienting valve, a first bypass conduit extending between said supply conduit and said feed conduit in bypassing relation to said leveling valve, a second bypassing conduit extending between said exhaust conduit and said feed conduit in bypassing relation to said leveling valve, oppositely acting check valve means interposed in the respective bypass conduits, said check valve means respectively acting to prevent fluid flow from said feed conduit to said exhaust conduit and from said supply conduit to said feed conduit, said leveling valve including means for alternatively connecting said supply and exhaust conduits to said feed conduit in response to weight changes on said spring to maintain said frame at a predetermined level, a connector conduit extending between said flow orienting valve and said supply conduit, said connector conduit being connected to said supply conduit between said off-on valve means and said leveling valve, said flow orienting valve including means for alternatively connecting said exhaust conduit to an air discharge port or to said supply conduit.

References Cited in the file of this patent
UNITED STATES PATENTS

| | | |
|---|---|---|
| 1,875,052 | Ljungkull | Aug. 30, 1930 |
| 2,443,433 | Sanmori | June 15, 1948 |
| 2,447,559 | Bloemers | Aug. 24, 1948 |
| 2,844,386 | Pribonic | July 22, 1958 |
| 2,919,930 | Cislo | Jan. 5, 1960 |
| 2,969,975 | Chuba | Jan. 31, 1961 |
| 3,003,781 | Black | Oct. 10, 1961 |